Jan. 26, 1965  E. J. DI NOIA  3,167,733
RESISTANCE TEMPERATURE SENSING ELEMENT
Filed Feb. 28, 1964  2 Sheets-Sheet 1

INVENTOR.
EMANUEL J. DI NOIA
BY
*Benj. T. Rauber*
ATTORNEY

Jan. 26, 1965    E. J. DI NOIA    3,167,733
RESISTANCE TEMPERATURE SENSING ELEMENT
Filed Feb. 28, 1964    2 Sheets-Sheet 2
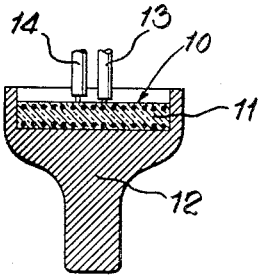
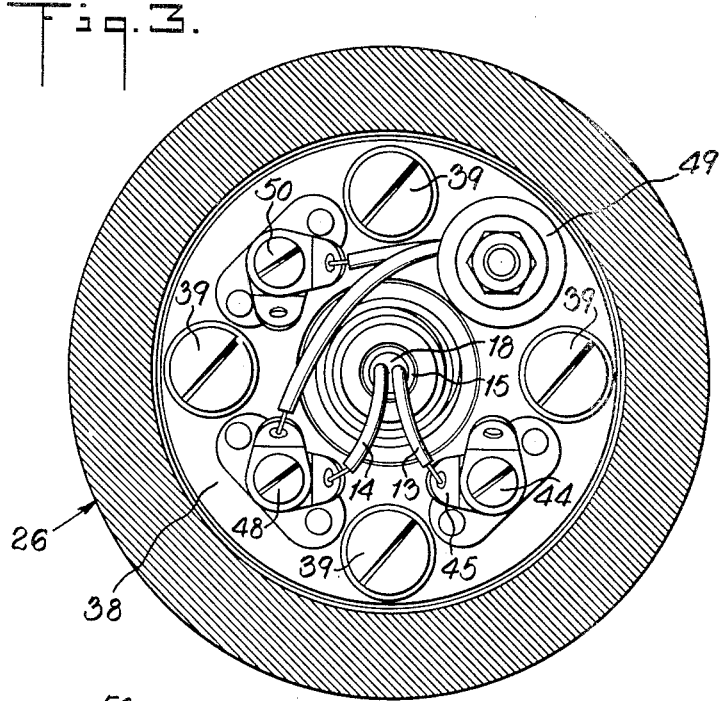
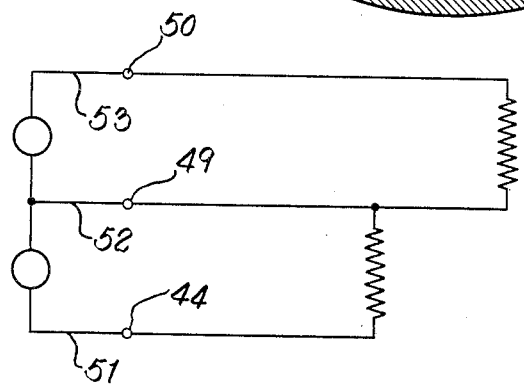
INVENTOR.
EMANUEL J. DI NOIA
BY
Benj. T. Rauber
ATTORNEY 3,167,733
RESISTANCE TEMPERATURE SENSING ELEMENT
Emanuel J. Di Noia, Briarcliff Manor, N.Y., assignor, by mesne assignments, to Universal Oil Products Company, Des Plaines, Ill., a corporation of Delaware
Filed Feb. 28, 1964, Ser. No. 348,215
16 Claims. (Cl. 338—28)

My present invention relates to a resistance temperature sensing element for use in a wall of a container or conduit in which a fluid is contained or through which a fluid passes to measure the temperature at any time by the electric resistance of an electric conductor. The electric resistance at any temperature may be measured by known means and provides an accurate measure of the temperature.

Heretofore sensing elements have been known in which the element was projected through an opening in the wall of the container or conduit so that it was in immediate contact with the fluid therein contained. This enabled a prompt and accurate sensing of the temperature to be obtained but had the disadvantage that, in case it became necessary to remove the sensing element for replacement or repair, a shut-down of the apparatus in which the sensing element or unit was mounted was necessary and was time consuming as it required emptying the apparatus in which the sensing unit was mounted.

My present invention provides a sensing element which may be mounted in a blind hole in the wall of the container or conduit to extend very close to the inner surface of the container or conduit. The temperature at the bottom of the hole adjusts itself to the temperature within the container or conduit. In this hole there is mounted an assembly comprising a sensing unit contacting the bottom of the hole. The sensing unit contains a resistance element within and insulated electrically from a button in close contact with the bottom.

The enclosing button for the resistance element is made of a metal of high heat conductivity and high resistance to corrosion, preferably gold, but silver, platinum or aluminum may be used. The surface of this button that is to contact the bottom of the hole is uncoated and is shaped to make contact with the bottom of the hole to provide the maximum conductivity to the button and the sides are coated with a "Rokide" coating to insulate the button from the sides of the hole. This coating may be about 0.005" thick. "Rokide" is a zirconium oxide and is sold as rods, powder or paste. It is conveniently and effectively applied by a spray gun at a temperature of 1100° F. to 1200° F. It is dielectric, refractory to heat and of high compressive strength.

The upper side of the button is recessed slightly to receive the resistance element. This element is a coil or grid of fine platinum wire or filament coated with and embedded in and covered by a Rokide ceramic which protects the grid and insulates it electrically from the button but permits heat to be readily conducted from the button to the grid. The ends of the platinum grid are brazed or soldered with a silver solder or equiavlent to conductor or lead wires, preferably of nickel, enclosed in fibre glass insulating tubing.

These nickel conductor or lead wires are, in turn, enclosed in a metallic sheathed ceramic insulated conduit brazed at its lower end to the button. The opposite end of the conduit is similarly brazed to a cage through which the conductor wires pass. The cage is slidable vertically in a mounting and is spring pressed to bias the button onto the bottom of the hole. The mounting is attached to the wall of the container or conduit and extends upwardly beyond the cage and encloses a vertically adjustable member above the cage and a spring between this member and the cage thus providing an adjustment of the pressure of the spring on the cage and the button. The mounting comprises a housing enclosing the ceramic insulated conduit, the cage, the vertically adjustable member and a reference resistance. The insulated conductor or lead wires and the conduit enclosing them extend upwardly to the reference resistance and to terminals for attachment to voltammeters or other apparatus for measuring the resistance of the grid at various temperatures.

The various features of my invention are illustrated, by way of example, in the accompanying drawings, in which, FIG. 1 is a vertical section of apparatus embodying the invention, FIG. 2 is a vertical section on a larger scale of the button and grid mounted therein.

FIG. 3 is a horizontal section on line 3—3 of FIG. 1, and

FIG. 4 is a wiring diagram illustrating the manner of use of the sensing element of the invention.

Figure 1:
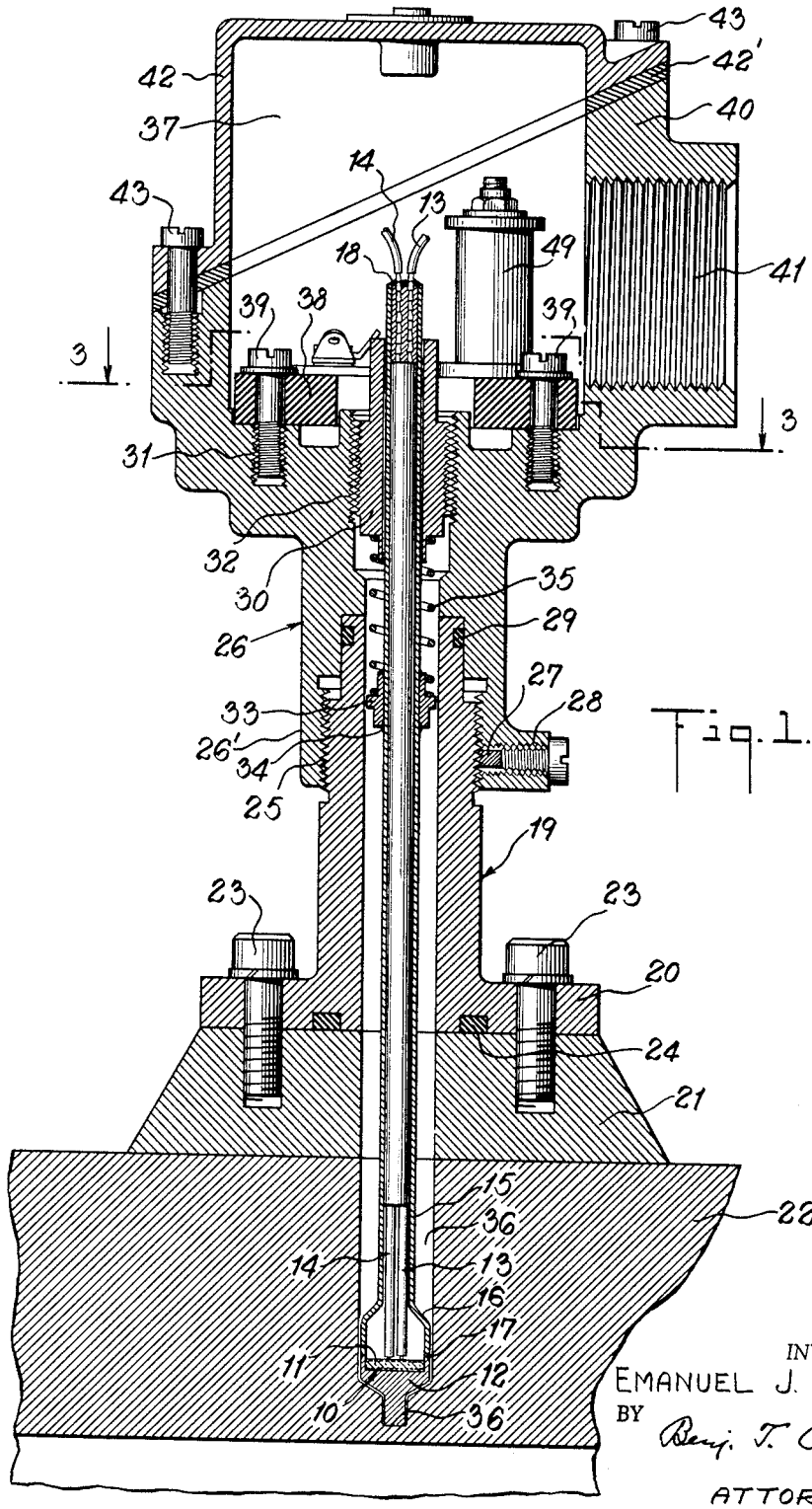

The sensing element shown at 10 in FIG. 2 is a fine wire or filament of platinum coated with a Rokide coating and bent to form parallel lengths. It is set into a ceramic disc 11, which may be Rokide and is embedded in Rokide to form a rigid disc protecting the fragile filament. The Rokide also insulates the lengths of the grid electrically. The position of the filament in the disc permits an adequate heat transfer from the gold button.

The disc containing the grid is fitted into a button of gold or equivalent metal 12 the lower face of which is shaped to provide a close contact with the bottom of a hole into which the button is to be inserted. This face is not coated but is in surface to surface contact with the bottom of the hole. The surface of the button extending upwardly from this lower face is coated with a thin coating of Rokide, for example, a coating about 0.005" thick. The upper face of the button is recessed to receive the sensing element disc.

A pair of conductor wires 13 and 14, preferably of nickel, enclosed in fibreglass insulating tubing are soldered by silver brazing to the ends of the platinum grid filaments and extend upwardly through a metal tube 15 flared out as at 16 to form a cap for the button and sensing filament and hermetically joined to the upper surface of the button by a silver solder joint 17. The tube is filled with zirconium oxide and the upper end of the tube is sealed about the wires 13 and 14 by alundum RA1162 high temperature cement and aeroseal water proofing cement 18.

The conduit or tube 15 is held in place by a mounting in which is mounted a spring support for a spring acting on a spring cage on the tube to bias the tube and the button soldered to it into resilient contact with the bottom of the hole into which the tube projects.

The mounting comprises a housing support 19 having a flange 20 by means of which the support may be secured to a raised portion 21 of the wall 22 of the container or conduit by means of screws 23. The support is sealed to the portion 21 by means of a silicone O-ring 24 set into an annular groove in the bottom face of the support. The upper end of the support 19 is externally screw threaded at 25 onto which is screwed the lower end 26' of a housing 26. The housing is locked in position on the support by means of a lock plug 27 and a helicoil lock insert 28. It is also sealed to the support by a silicone O-ring 29 set into an annular recess in the portion of the support above the screw threaded portion 25.

Above the end of the support 19, the interior of the housing is enlarged to receive and hold adjustably a spring support 30. The spring support is held fixed in its positions of adjustment by means of helicoid inserts 31 and 32 which permit vertical adjustment of the spring support. Spaced below the spring support 30 is a spring cage 33 silver brazed at 34 to the tube 15. Held in compression between the spring support 30 and the spring cage is a coil spring 35.

The coil spring 35 serves to press or bias the tube 15 and with it the button 12 into the bottom of a hole 36 in the wall of the container or conduit containing the fluid whose temperature is to be sensed thereby ensuring a tight contact between the button and sensing filament with the bottom of the hole. The bottom of the hole extends to within a short distance, for example, 0.100″ to 0.110″, of the inner surface of the container or conduit so that any temperature changes are transmitted very quickly to the button and thence to the resistor grid.

Immediately above the spring support 30 the housing is enlarged to a chamber 37 in which the wires 13 and 14 are connected to terminals for connection to the elements for determining the resistance of the grid at various temperatures. The chamber 37 has a flat bottom surface or floor on which a terminal panel or board 38 is secured by screws 39 and upwardly extending enclosing wall 40, preferably of cylindrical shape, into which an outlet 41 opens. The chamber is closed by a removable cap 42 sealed to the wall 40 by a gasket 42′ and secured by screws 43. The adjoining edges of the wall 40 and cap 42 are slanted to accommodate the outlet and to provide the maximum space or opening when the cap is removed.

As shown in FIG. 3 one of the wires 13, 14, 13 for example, is secured to a terminal 44 having a wing 45 to which the wire is secured by solder and a wing 46 for a wire leading to the test apparatus such as indicated at 47. The other wire 14 is secured to one wing of a terminal 48 which has a terminal to which is connected a wire leading to a terminal of a reference resistance 49 comparable to the resistance of the grid 10. The other terminal of the reference resistance is connected to a terminal 50. Each of the terminals 44, 48 and 50 may be connected to lead wires indicated at 51, 52 and 53 in FIG. 4 which lead to apparatus for determining the resistance of the grid balanced against the resistance of the reference resistance. The apparatus for this purpose may be of any suitable known type such, for example, as a Wheatstone bridge.

In operation, the spring 35 presses the button 12 resiliently against the bottom of the hole thereby insuring against any air gap due to temperature or other changes. The tube 15 has sufficient resiliency to bend slightly so that the bottom of the button may adjust to the surface of the bottom of the hole to insure complete contact throughout the entire area of the bottom surface of the button. The shape of the button accommodates the particular situations in which the apparatus is to be used may be different from that illustrated. The button shown in the drawing is provided with a tip to extend into a hole of about one eighth of an inch in diameter and widened above to accommodate the larger diameter of the resistance element.

Having described my invention, I claim:

1. A heat sensing unit comprising a button of a metal of the group consisting of gold, silver, platinum and aluminum and having a contact face to receive heat and having a recess in the opposite face, a solid mass of zirconium oxide in said recess in contact with the surface of said recess, and a grid of platinum filament embedded in said mass of zirconium oxide.

2. The sensing unit of claim 1 in which said metal is gold.

3. The sensing unit of claim 1 in which said metal is silver.

4. The sensing unit of claim 1 in which said metal is platinum.

5. The sensing unit of claim 1 in which said metal is aluminum.

6. The sensing unit of claim 1 in which said zirconium oxide is fused to the surface of said recess and to said filament.

7. A heat sensing apparatus which comprises a button of a metal of the group consisting of gold, silver, platinum and aluminum and having a contact face to receive heat and having a recess in the opposite face, a solid mass of zirconium oxide in said recess in contact with the surface of said recess, a grid of platinum filament embedded in said mass of zirconium oxide, a metallic sheathed, ceramic insulated, conduit hermetically sealed to said button to enclose said grid, and a pair of insulated wires united respectively to the ends of said grid and extending through said conduit.

8. The heat sensing apparatus of claim 7 in which said conduit is filled with finely divided zirconium oxide.

9. A heat sensing apparatus for determining the temperature in a body of material enclosed by a wall having a blind hole extending to a bottom closely spaced from the inner surface of the wall, which comprises a mounting adapted to be attached to the outer surface of the wall and having a passage aligned with the hole and a chamber at the free end of said passage, a spring support secured in said passage, a conduit extending through said passage and said spring support to project into the hole, a spring cage secured on said conduit between said spring support and the end of said conduit projecting into said hole, a coil spring confined between said spring support and said spring cage to bias said conduit toward the bottom of the hole, a heat transfer button hermetically sealed to the end of said conduit projecting into the hole said button having a surface to contact the bottom of the hole and recesses in the surface enclosed in said conduit, a mass of zirconium oxide fused in said recess, a grid of platinum filament enclosed in said mass of zirconium oxide, and a pair of insulated conductor wires hermetically connected respectively to the ends of said grid and extending through said conduit.

10. The heat sensing apparatus of claim 9 in which button is of a metal of the group consisting of gold, silver, platinum and aluminum.

11. The heat sensing apparatus of claim 10 in which said button is uncoated at the surface contacting the bottom of the hole and in which the remaining surface outside said conduit is coated with zirconium oxide.

12. The heat sensing apparatus of claim 11 in which said conductor wires are sheathed with fibre glass tubing.

13. The heat sensing apparatus of claim 12 in which said conduit is filled with finely divided zirconium oxide.

14. The heat sensing apparatus of claim 13 in which said conduit is sealed at its upper end with a high temperature cement and a water proof coating.

15. The heat sensing apparatus of claim 14 in which said conduit is widened at the end sealed to said button and of smaller diameter from said widened part to said chamber.

16. The heat sensing apparatus of claim 15 having a comparison resistance in said chamber connected to one of said conductor wires and terminals, one for each end of said comparison resistance and one for the other of said conductor wires.

References Cited in the file of this patent
UNITED STATES PATENTS

| | | |
|---|---|---|
| 2,590,041 | Roost | Mar. 18, 1952 |
| 2,957,153 | Greenberg | Oct. 18, 1960 |
| 3,123,790 | Tyler | Mar. 3, 1964 |